United States Patent
Ohmi et al.

[19]

[11] Patent Number: 6,039,360

[45] Date of Patent: Mar. 21, 2000

[54] COUPLINGS FOR FLUID CONTROLLERS

[75] Inventors: Tadahiro Ohmi, 2-1-17-301, Komegafukuro, Aoba-ku, Sendai, Miyagi; Michio Yamaji, Osaka; Tsutomu Shinohara, Osaka; Shigeru Itoi, Osaka; Keiji Hirao, Osaka; Yuji Kawano, Osaka; Shigeaki Tanaka, Osaka; Kosuke Yokoyama, Osaka; Hiroshi Morokoshi, Osaka; Nobukazu Ikeda, Osaka, all of Japan

[73] Assignees: Tadahiro Ohmi, Sendai; Fujikin Incorporated, Osaka, both of Japan

[21] Appl. No.: 09/073,387

[22] Filed: May 6, 1998

[30] Foreign Application Priority Data

May 8, 1997 [JP] Japan .................................. 9-117702

[51] Int. Cl.⁷ ...................................................... F16L 3/26
[52] U.S. Cl. ..................... 285/61; 285/125.1; 248/225.11
[58] Field of Search ............................. 137/884; 138/112, 138/DIG. 9, 106; 248/74.4, 73, 223.41, 224.7, 225.11, 674; 285/61, 125.1, 133.11, 134.1, 325, FOR 132, FOR 139

[56] References Cited

U.S. PATENT DOCUMENTS

| | | | |
|---|---|---|---|
| 2,286,105 | 6/1942 | Quinn ....................................... 285/327 |
| 2,658,776 | 11/1953 | Wilcox .............................. 285/125.1 X |
| 3,012,581 | 12/1961 | Wilson ................................ 137/625.5 |
| 3,486,771 | 12/1969 | Conlin ............................ 285/133.11 X |
| 3,975,068 | 8/1976 | Speckin ................................ 248/674 X |
| 4,566,865 | 1/1986 | Nishitsuji et al. .................. 248/674 X |
| 5,205,520 | 4/1993 | Walker .................................. 285/61 X |
| 5,266,740 | 11/1993 | Hsu ....................................... 285/61 X |
| 5,732,744 | 3/1998 | Barr et al. .............................. 285/61 X |
| 5,819,782 | 10/1998 | Itafuji .................................. 137/884 X |
| 5,860,676 | 1/1999 | Brzezicki et al. ............... 285/125.1 X |

FOREIGN PATENT DOCUMENTS

| | | |
|---|---|---|
| 0 703 391 A1 | 3/1996 | European Pat. Off. . |
| 0 715 112 A2 | 6/1996 | European Pat. Off. . |
| 1 579 506 | 8/1969 | France . |
| 2 250 907 | 6/1975 | France . |
| 2 647 522 | 11/1990 | France . |
| 25 15 050 A1 | 10/1975 | Germany . |
| 25 18 465 A1 | 11/1976 | Germany . |
| 3131336 | 2/1983 | Germany ................................ 285/132 |
| 2 178 140 | 2/1987 | United Kingdom . |

*Primary Examiner*—Lynne H. Browne
*Assistant Examiner*—Greg Binda
*Attorney, Agent, or Firm*—Armstrong, Westerman Hattori, McLeland & Naughton

[57] ABSTRACT

A coupling comprises a holding member having a U-shaped cross section, and a channel member held by the holding member. The holding member has an upper wall formed with screw bores for use in attaching the holding member to a fluid controller. The channel member comprises a body having an inner channel and fitted in a space between the upper wall of the holding member and a lower wall thereof, a tubular upward projection communicating with the inner channel of the body and having an upper end inserted in a through bore in the upper wall of the holding member to communicate with a downward channel of the fluid controller, and a tubular lateral projection communicating with the inner channel of the body and extending laterally. The upper end of the channel member has an outward flange, and the through bore of the upper wall of the holding member has an inward flange for supporting the flange.

6 Claims, 8 Drawing Sheets

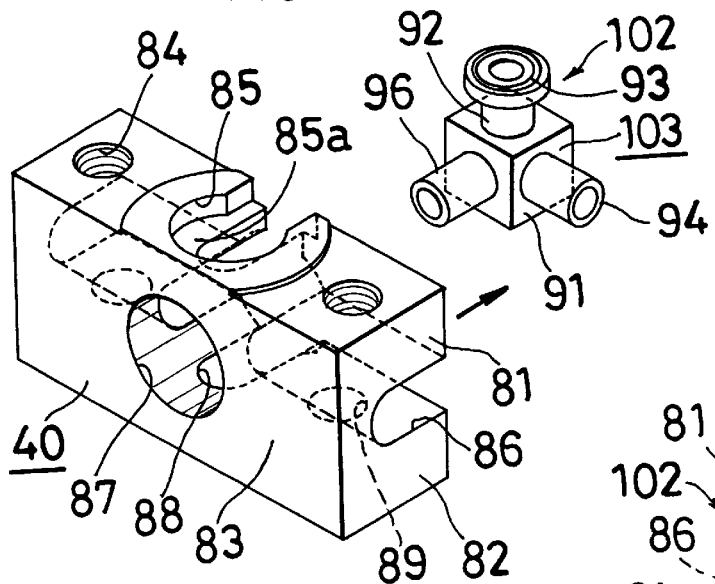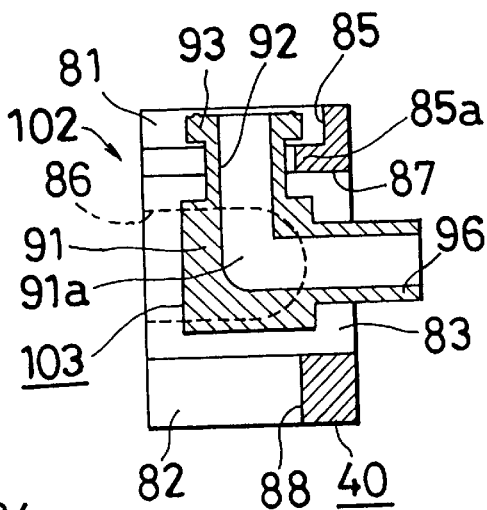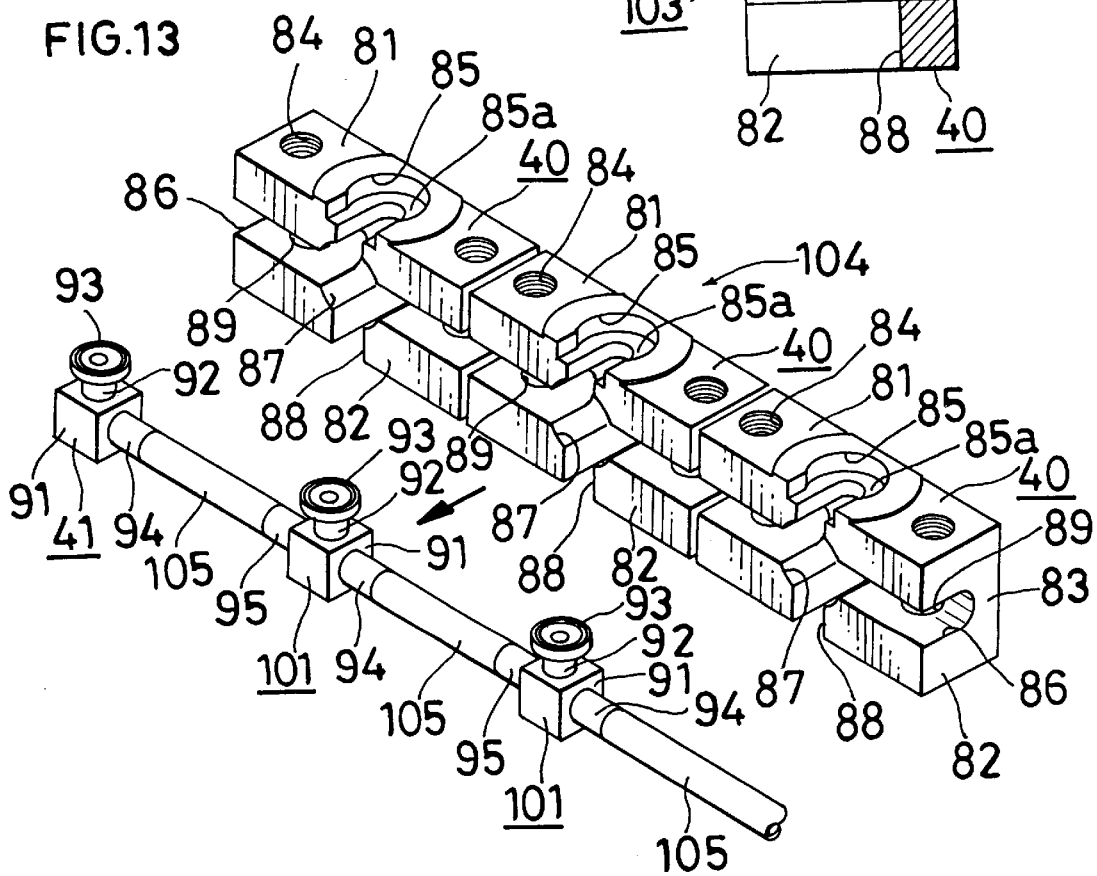

COUPLINGS FOR FLUID CONTROLLERS

BACKGROUND OF THE INVENTION

The present invention relates to couplings for fluid controllers, and more particularly to fluid controller couplings which are designed for use in fluid control apparatus included in semiconductor manufacturing equipment and which are useful, for example, for on-off valves provided for a massflow controller to hold the channels of the valves in communicate with each other.

The terms "upper" and "lower" as used herein refer respectively to the upper and lower sides of the drawings. However, these terms are used for the sake of convenience; the shutoff-opening device to be described below will be mounted on a horizontal surface, for example, in the state shown in FIG. 1 or as turned upside down, or may be attached to a vertical surface.

In the case of the fluid control apparatus included in semiconductor manufacturing equipment, a plurality of valves are usually arranged at each of the inlet side and the outlet side of a massflow controller. The valves as arranged in a row are removably mounted on a blocklike coupling from above to provide a shutoff-opening device as a unit instead of interconnecting the valves by tubing (see JP-A No. 241400/1994). Each of the valves has an inlet and an outlet in its bottom face, and the blocklike coupling is formed with an inflow channel and an outflow channel as positioned in conformity with the positions of the inlet and the outlet. The valves are removably mounted on the coupling from above so that the valves of the shutoff-opening device as mounted on a base plate can be individually inspected or replaced.

One fluid control apparatus has many shutoff-opening devices, which can be diversified in specifications. Some of the shutoff-opening devices have two or four valves, and some are different in the interval between the valves and accordingly in the positions of the valve inlets and outlets. An inlet-outlet subopening serving as an inlet or outlet for other fluid may be additionally provided between the inlet and the outlet of at least one valve. The conventional shutoff-opening devices have the problem of being composed of many different members which are difficult to standardize because even if some of such devices are different in the position of one outlet alone, there arises a need to prepare a new blocklike coupling.

When the coupling in the form of a block has an opening at each of its opposite ends, the channel through the coupling is relatively easy to make, whereas if the coupling has an opening only at one end, it becomes necessary to form an opening also at the other end and thereafter close this opening, hence the problem of necessitating a cumbersome procedure for forming the channel. It is further required that the fluid control apparatus be made lightweight, but the blocklike coupling is disadvantageous in reducing the weight of the apparatus.

SUMMARY OF THE INVENTION

An object of the present invention is to provide a fluid controller coupling which is designed for use in fluid control apparatus for semiconductor manufacturing equipment and which comprises standardized members, can be produced with greater ease and is reduced in weight.

The present invention provides as a first feature thereof a coupling for a fluid controller, the coupling being attachable to an opening portion of a downward channel of the fluid controller, the coupling comprising a holding member having a U-shaped cross section and a tubular channel member held by the holding member, the channel member having an upper end inserted in a through bore formed in an upper wall of the holding member to communicate with the downward channel of the fluid controller, the upper wall of the holding member being formed with screw bores for use in attaching the holding member to the fluid controller.

The tubular channel member is I-shaped, L-shaped or inverted T-shaped.

The invention provides as a second feature thereof a fluid controller coupling described above wherein the upper end of the channel member has an outward flange, and the through bore of the upper wall of the holding member has an inward flange for supporting the flange. The channel member can then be held by the holding member easily without necessitating a cumbersome procedure such as welding, merely by placing the flange of the channel member on the inward flange of the holding member in bearing contact therewith.

The invention provides as a third feature thereof a fluid controller coupling embodying the first feature wherein the channel member comprises a body having an inner channel and fitted in a space between the upper wall of the holding member and a lower wall thereof, a tubular upward projection communicating with the inner channel of the body and having an upper end inserted in the through bore in the upper wall of the holding member to communicate with the downward channel of the fluid controller, and at least one tubular lateral projection communicating with the inner channel of the body and extending laterally. The channel member can then be held by the holding member easily without necessitating a cumbersome procedure such as welding, merely by fitting the body of the channel member into the space between the upper and lower walls of the holding member. The channel member usually has one or two tubular lateral projections. When the channel member has one lateral projection, the inner channel of the channel member is L-shaped. The lateral projection may then extend longitudinally of the holding member or widthwise of the holding member. When the channel member has two lateral projections, the second lateral projection additionally provided may be positioned at a right angle with the first lateral projection or may extend as aligned with the first lateral projection, with the body positioned between the lateral projections.

The couplings embodying the first to third features of the invention are used singly or in various combinations. These fluid controller couplings, when used, give a smaller weight to the fluid control apparatus than when the blocklike coupling is used because the holding member has a U-shaped cross section.

The invention provides as a fourth feature thereof a coupling for use with two fluid controllers each having a downward channel to hold the channels in communication with each other, the coupling comprising first and second holding members each having a U-shaped cross section and arranged at a spacing with openings thereof opposed to each other, and a U-shaped tubular channel member, the channel member having one end inserted in a through bore formed in an upper wall of the first holding member to communicate with the downward channel of the first of the fluid controllers, the channel member having the other end inserted in a through bore formed in an upper wall of the second holding member to communicate with the downward channel of the second fluid controller, the upper walls of the holding members being formed with screw bores for use in attaching the holding members to the respective fluid controllers.

The coupling embodying the fourth feature of the invention has a channel which is U-shaped in its entirety for holding two fluid controllers in communication with each other. Since the holding members are U-shaped in cross section, the use this coupling, like the coupling of the first feature of the invention, results in a smaller weight than when the blocklike coupling is used.

The invention provides as a fifth feature thereof a fluid controller coupling embodying the fourth feature wherein the channel member comprises a first L-shaped channel member and a second L-shaped channel member, the first L-shaped channel member comprising a body having an inner channel and fitted in a space between the upper wall of the first holding member and a lower wall thereof, a tubular upward projection communicating with the inner channel of the body and having an upper end inserted in the through bore in the upper wall of the first holding member to communicate with the downward channel of the first fluid controller, and a tubular lateral projection communicating with the inner channel of the body and extending toward the second holding member, the second L-shaped channel member comprising a body portion having an inner channel and fitted in a space between the upper wall of the second holding member and a lower wall thereof, a tubular upward projection communicating with the inner channel of the body portion and having an upper end inserted in the through bore in the upper wall of the second holding member to communicate with the downward channel of the second fluid controller, and a tubular lateral projection communicating with the inner channel of the body portion and extending toward the first holding member, the tubular lateral projections of the two L-shaped channel members having outer ends joined to each other.

The invention further provides as a sixth feature thereof a coupling for use with a plurality of fluid controllers each having a downward channel to hold the channels in communication with one another, the coupling comprising a plurality of holding members each having a U-shaped cross section and arranged in alignment with openings thereof facing toward the same direction, and a plurality of channel members held by the respective holding members, each of the channel members comprises a body having an inner channel and fitted in a space between upper and lower walls of the holding member, a tubular upward projection communicating with the inner channel of the body and having an upper end inserted in a through bore in the upper wall of the holding member to communicate with the downward channel of the fluid controller, and tubular lateral projections communicating with the inner channel of the body and each extending toward the holding member adjacent thereto, the opposed lateral projections of each pair of adjacent channel members having outer ends joined to each other, the upper wall of each of the holding members having screw bores for use in attaching the holding member to the fluid controller.

The coupling embodying the sixth feature of the invention has a straight main channel extending longitudinally of the aligned holding members and short subchannels orthogonal to the main channel for communication with the respective fluid controllers. In joining the outer ends of the opposed lateral projections of the adjacent channel members, the projections are joined end-to-end in butting contact or connected together by a communication pipe of required length. The lateral projections can then be made to have a definite length for use with a communication pipe of suitably adjusted length. This serves to reduce the number of kinds of channel members. Each of the channel members may have a second tubular projection communicating with the inner channel of the body and orthogonal to, or extending in a reverse direction to, the first tubular lateral projection. The coupling is then usable in communication with the channel or piping of other fluid controller for wider application.

Each of the couplings embodying the fifth and sixth features of the invention can be provided essentially by a combination of couplings having the third feature of the invention. The items to be altered for providing the coupling of different design are limited only to the number of holding members, number of channel members, orientation of the openings of the holding members, and number, orientation and length of tubular lateral projections of the channel members, with the result that fluid control apparatus of altered specifications are readily available with the increase in the number of kinds of components diminished, hence standardization of component members. The work required for producing such couplings of the invention is mainly the joining of lateral projections of channel members, and the cumbersome boring operation obviated renders the couplings easier to make.

BRIEF DESCRIPTION OF THE DRAWINGS

FIG. 11 is a perspective view of another fluid controller coupling as a fifth embodiment of the invention;

FIG. 12 is a view in cross section of the same;

FIG. 13 is a perspective view of another fluid controller coupling as a sixth embodiment of the invention;

DESCRIPTION OF THE PREFERRED EMBODIMENTS

Some embodiments of the present invention will be described below with reference to the drawings.

Figure 1:
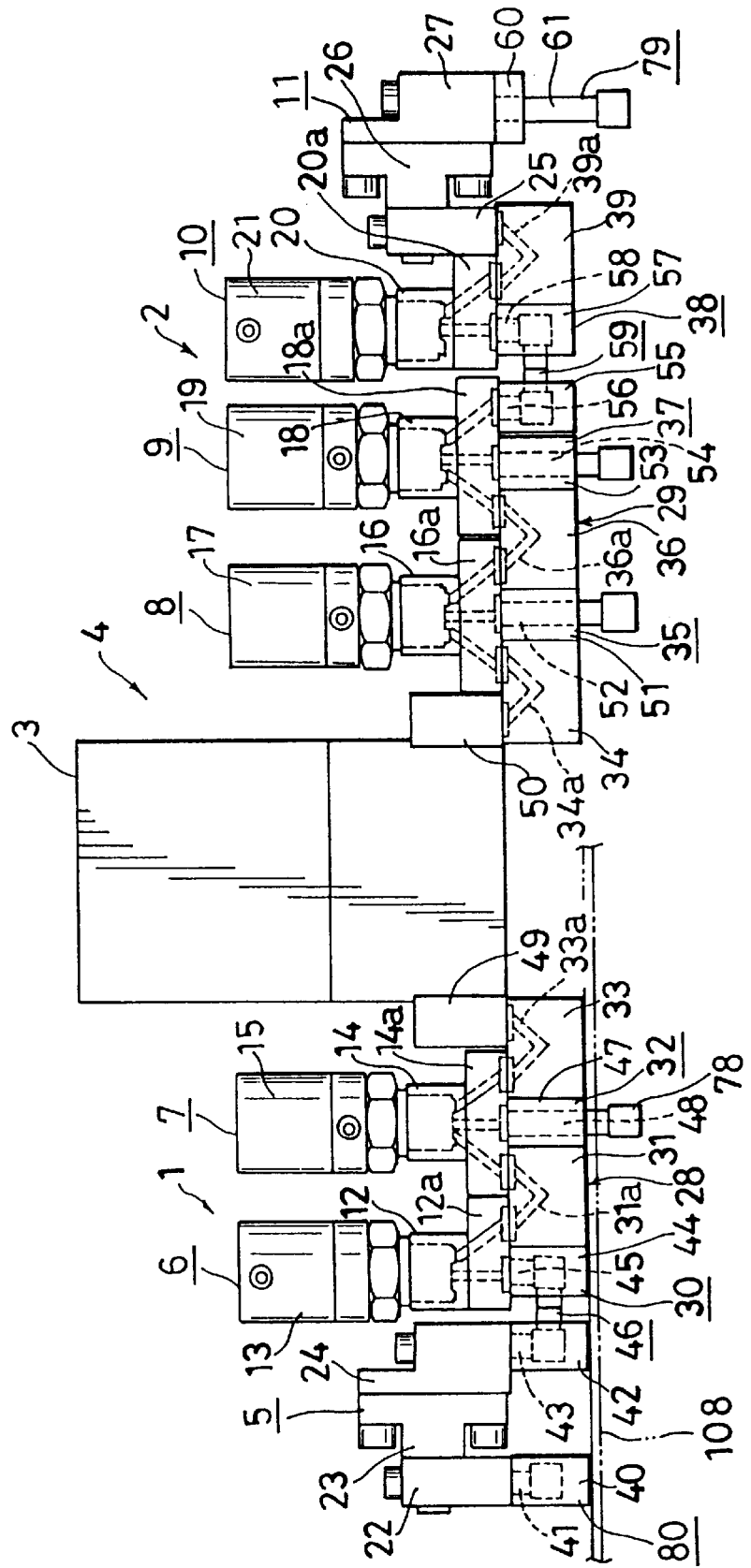
FIG. 1 is a front view showing a fluid control apparatus wherein fluid controller couplings of the invention are used.
Figure 2:
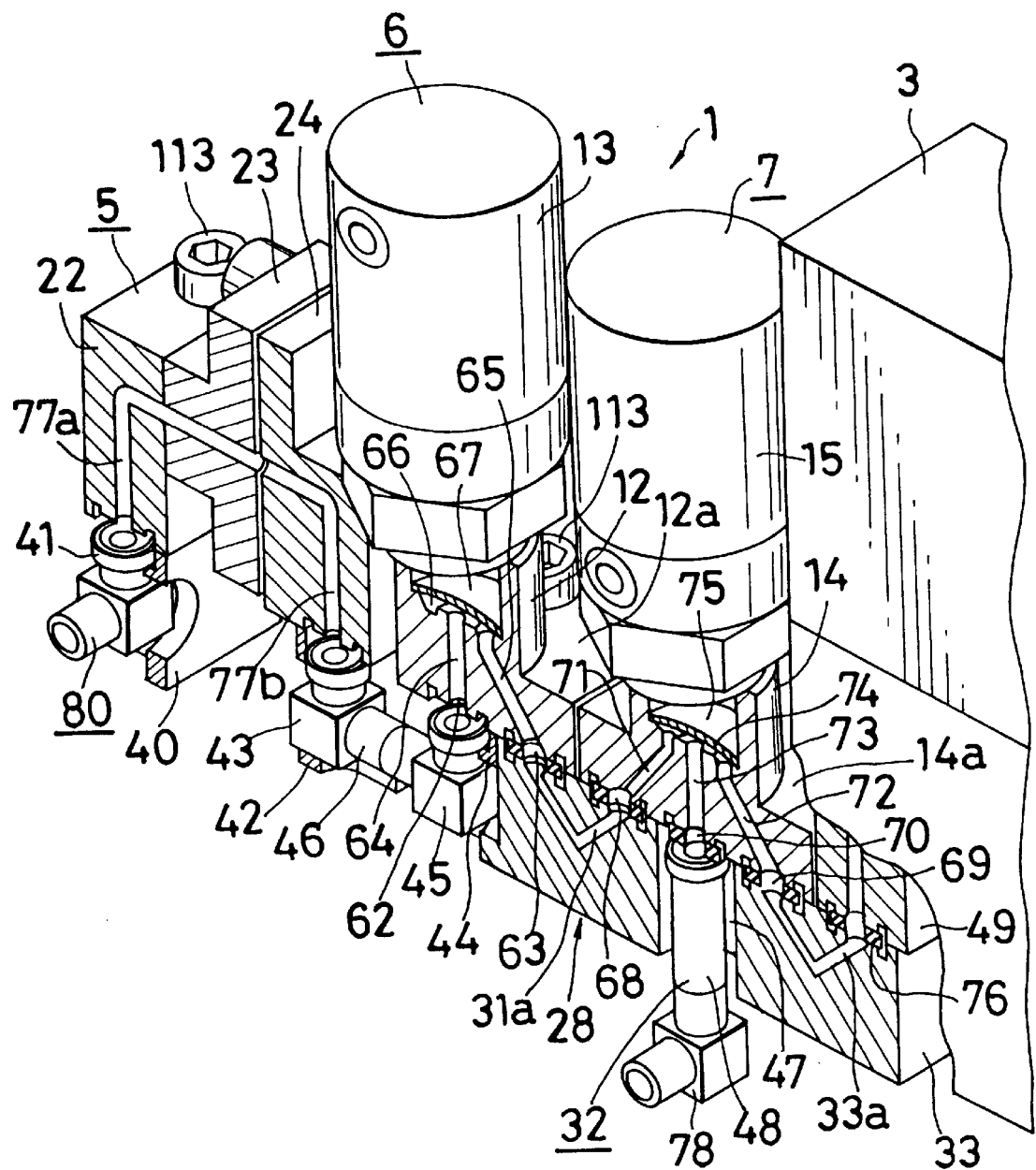
FIG. 2 is an exploded fragmentary perspective view partly broken away and showing the apparatus of FIG. 1 on an enlarged scale.

FIGS. 1 and 2 show an example of fluid control apparatus having incorporated therein fluid controller couplings of the invention. The fluid control apparatus 4 is adapted for use in semiconductor manufacturing equipment or the like and comprises a massflow controller 3, and shutoff-opening devices 1, 2 at the left and right of the controller 3.

The shutoff-opening device 1 at left comprises a first on-off valve 6 at left, a second on-off valve 7 at right and a first valve mount 28 having the two valves 6, 7 mounted thereon. The first valve mount 28 comprises a plurality of couplings 80, 30, 31, 32, 33 as will be described later. Disposed at the left of the left shutoff-opening device 1 is a first check valve 5.

The shutoff-opening device 2 at right comprises a third on-off valve 8 disposed at left, a fourth on-off valve 9 disposed at an intermediate position, a fifth on-off valve 10 disposed at right and a second valve mount 29 having these valve 8, 9, 10 mounted thereon. The second valve mount 29 comprises a plurality of couplings 34, 35, 36, 37, 38, 39, 79 as will be described later. Disposed at the right of the right shutoff-opening device 2 is a second check valve 11.

The on-off valves 6, 7, 8, 9, 10 comprise respective main bodies 12, 14, 16, 18, 20 and respective actuators 13, 15, 17, 19, 21 mounted thereon from above for suitably opening and closing a channel through each valve main body. The main bodies 12 to 20 of the on-off valves 6 to 10 are provided at their lower ends with flanges 12a, 14a, 16a, 18a, 20a, respectively, which are rectangular when seen from above.

Each of the check valves 5, 11 comprises a left main body 22 (25) having an inlet in its bottom face, a middle main body 23 (26) screwed to the main body 22 (25) and a right main body 24 (27) having an outlet in its bottom face and fastened with screws to the middle main body 23 (26).

The massflow controller 3 is formed on the left side of its lower end with a rectangular parallelepipedal leftward extension 49 having an inlet in its bottom face, and on the right side of its lower end with a rectangular parallelepipedal rightward extension 50 having an outlet in its bottom face.

The bottom faces of the valve main bodies 22, 23, 24, 12, 14 at the left of the massflow controller 3 and the bottom face of the leftward extension 49 of the controller 3 are all flush with one another. The rightward extension 50 of the controller 3 and the valve main bodies 16, 18, 20, 25, 26, 27 have their bottom faces positioned all flush with one another.

The inlet of left main body 22 of the first check valve 5 is provided with a purge gas supply coupling 80 connected to a purge gas supply line and comprising a holding member 40 and an L-shaped channel member 41 held by the member 40.

The outlet of right main body 24 of the first check valve 5 is held in communication with an inlet of main body 12 of the first on-off valve 6 by a first inflow channel coupling 30 for introducing a fluid into the left shutoff-opening device 1. The coupling 30 comprises two holding members 42, 44 and a U-shaped communication channel member 46 held by these members 42, 44 and comprising two L-shaped channel members 43, 45 which are joined to each other.

Opposed to both the bottom face of rightward portion of main body 12 of the first on-off valve 6 and the bottom face of leftward portion of main body 14 of the second on-off valve 7 is a coupling 31 in the form of a rectangular parallelepipedal block for forming a first communication channel and having a V-shaped channel 31a for causing an outlet of the valve 6 to communicate with an inlet of the valve 7.

The main body 14 of the second on-off valve 7 has an inlet-outlet subopening, which is provided with a first subchannel coupling 32 comprising a holding member 47 and an I-shaped channel member 48 and held by the member 47. Attached to the lower end of the coupling 32 is a known L-shaped coupling 78 connected to a process gas supply line.

Disposed beneath both the rightward portion of main body 14 of the valve 7 and the leftward extension 49 of the massflow controller 3 is a coupling 33 in the form of a rectangular parallelepipedal block for forming a first outflow channel and having a V-shaped channel 33a for sending a fluid from the outlet of the valve 7 to the controller 3.

Disposed beneath both the bottom face of rightward extension 50 of the massflow controller 3 and the bottom face of leftward portion of main body 16 of the third on-off valve 8 is a coupling 34 in the form of a rectangular parallelepipedal block for forming a second inflow channel and having a V-shaped channel 34a for introducing a fluid from the controller 3 into the right shutoff-opening device 2.

The main body 16 of the third on-off valve 8 has an inlet-outlet subopening, which is provided with a second subchannel coupling 35 connected to an evacuating line and comprising a holding member 51 and an L-shaped channel member 52 and held by the member 51.

Disposed beneath both the bottom face of rightward portion of main body 16 of the third on-off valve 8 and the bottom face of leftward portion of main body 18 of the fourth on-off valve 9 is a coupling 36 in the form of a rectangular parallelepipedal block for forming a second communication channel and having a V-shaped channel 36a for causing an outlet of the valve 8 to communicate with an inlet of the valve 9.

The main body 18 of the fourth on-off valve 9 has an inlet-outlet subopening, which is provided with a third subchannel coupling 37 connected to a process gas supply line and comprising a holding member 53 and an L-shaped channel member 54 and held by the member 53.

An outlet of main body 18 of the fourth on-off valve 9 is held in communication with an inlet of main body 20 of the fifth on-off valve 10 by a third communication channel coupling 38, which comprises two holding members 55, 57 and a communication channel member 59 held by these members. The member 59 comprises two L-shaped channel members 56, 58 joined to each other.

Disposed beneath both the bottom face of rightward portion of main body 20 of the fifth on-off valve 10 and the bottom face of left main body 25 of the second check valve 11 is a coupling 39 in the form of a rectangular parallelepipedal block for forming a second outflow channel and having a V-shaped channel 39a for causing an outlet of the valve 10 to communicate with the inlet of the valve 11.

The outlet of right main body 27 of the second check valve 11 is provided with a purge gas discharge coupling 79 connected to a purge gas discharge line and comprising a holding member 60 and an L-shaped channel member 61 held by the member 60.

The first inflow channel coupling 30, first communication channel coupling 31, first subchannel coupling 32 and first outflow channel coupling 33 which are positioned at the left side of the controller 3 form the first valve mount 28 of the left shutoff-opening device 1. According, the shutoff-opening device 1 has a purge gas channel through which a purge gas admitted through the check valve 5 is discharged via the first inflow channel coupling 30, the main body 12 of the first on-off valve 6, the first communication coupling 31, the main body 14 of the second on-off valve 7 and the first outflow channel coupling 33, and a process gas channel through which a process gas admitted from the bottom face of the first subchannel coupling 32 is discharged via the coupling 32, the main body 14 of the second on-off valve 7 and the first outflow channel coupling 33.

The second inflow channel coupling 34, second subchannel coupling 35, second communication channel coupling 36, third subchannel coupling 37, third communication channel coupling 38 and second outflow channel coupling 39 which are positioned at the right side of the controller 3 provide the valve mount 29 of the right shutoff-opening device 2. Accordingly, the shutoff-opening device 2 has a purge gas channel through which the purge gas introduced via the controller 3 is discharged by way of the second inflow channel coupling 34, second communication channel coupling 36, third communication channel coupling 38 and second outflow channel coupling 39; a process gas channel through which the process gas admitted through the controller 3 is fed to a process chamber via the second inflow channel coupling 34, second communication channel coupling 36 and third subchannel coupling 37; and an evacuating channel for drawing off the gas from these channels via the second subchannel coupling 35.

As shown on an enlarged scale in FIG. 2, the first check valve 5 has an inflow channel 77a and an outflow channel 77b which are opened downward. The first one-off valve 6 is a two-port valve, and the main body 12 of this valve is formed in its bottom face with an inlet 62 positioned approximately centrally thereof, and an outlet 63 positioned at right. The valve main body 12 is internally formed with an inflow channel 64 extending from the inlet 62 to a valve chamber 66, and an outflow channel 65 extending from the outlet 63 to the chamber 66. The actuator 13 of the first on-off valve 6 serves to operate a valve element 67 in the form of a diaphragm. When operated, the actuator 13 opens or closes the inflow channel 64 with the valve element 67. The second on-off valve 7 is a three-port valve, and the main body 14 thereof is formed in its bottom face with an inlet 68 at left, an outlet 69 at right and an inlet-outlet subopening 70 positioned approximately in the center to serve as an inlet or outlet for other fluid. The valve main body 14 is internally formed with an inflow channel 71 extending from the inlet 68 to a valve chamber 74, a subchannel 73 extending from the subopening 70 to the chamber 74 and an outflow channel 72 extending from the outlet 69 to the chamber 74. The actuator 15 of the second on-off valve 7 serves to operate a valve element 75 in the form of a diaphragm. When operated, the actuator 15 opens or closes the subchannel 73 with the valve element 75. On the other hand, the inflow channel 71 extending to the inlet 68 of the second on-off valve 7 is always in communication with the outflow channel 72 extending to the outlet 69 through the valve chamber 74.

A seal 76 as shown in FIG. 2 is provided between each of the valve main bodies 22, 23, 24, 12, 14, 16, 18, 20, 25, 26, 27 and at least one of the members 41, 30, 31, 32, 33, 34, 35, 36, 37, 38, 39, 61 joined thereto in butting contact. The check valves 5, 11 and the on-off valves 6, 7, 8, 9, 10 are each fastened to at least one of the couplings 80, 30, 31, 32, 33, 34, 35, 36, 37, 38, 39, 79 opposed thereto with a bolt 113 screwed into the main body 22, 23, 24, 12, 14, 16, 18, 20, 25, 26 or 27 (see FIG. 2). The check valves 5, 11 and the on-off valves 6 to 10 can be removed upward by removing these bolts 113. In construction, the second check valve 11 is identical with the first check valve 5, the fifth on-off valve 10 with the first on-off valve 6, and the third and fourth on-off valves 8, 9 with the second on-off valve 7.

With the fluid control apparatus 4 having the foregoing construction, the process gas is admitted into the first subchannel coupling 32 of the left shutoff-opening device 1, with the first on-off valve 6 closed, the second on-off valve 7 held open, the third on-off valve 8 closed, the fourth on-off valve 9 held open and the fifth on-off valve 10 closed, whereupon the process gas flows through the main body 14 of the second on-off valve 7 and the first outflow channel coupling 33 into the massflow controller 3, wherein the gas has its flow rate regulated. The gas is then admitted into the right shutoff-opening device 2, thereafter flows through the second inflow channel coupling 34, the main body 16 of the third on-off valve 8, the second communication channel coupling 36, the main body 18 of the fourth on-off valve 9 and the third subchannel coupling 37 and is sent into the process chamber. When the purge gas is thereafter admitted into the first check valve 5, with the first on-off valve 6 held open, the second on-off valve 7 closed, the third on-off valve 8 closed, the fourth on-off valve 9 closed and the fifth on-off valve 10 held open, the purge gas flows through the first inflow channel coupling 30, the main body 12 of the first on-off valve 6, the first communication channel coupling 31, the main body 14 of the second on-off valve 7 and the first outflow channel coupling 33, reaches the massflow controller 3, further flows through the second inflow channel coupling 34, the main body 16 of the third on-off valve 8, the second communication channel coupling 36, the main body 18 of the fourth on-off valve 9, the third communication channel coupling 38, the main body 20 of the fifth on-off valve 10, second outflow channel coupling 39 and the second check valve 11, and is discharged. At this time, the purge gas drives out with its own pressure the process gas remaining in the main body 14 of the second on-off valve 7, first outflow channel coupling 33, second inflow channel coupling 34 and second communication channel coupling 36, with the result that purge gas only flows through the apparatus in a short period of time.

With the shutoff-opening devices 1, 2, the first inflow channel coupling 30 and the third communication channel coupling 38 are common members, the first communication channel coupling 31, first outflow channel coupling 33, second inflow channel coupling 34, second communication channel coupling 36 and second outflow channel coupling 39 are common members, and subchannel couplings 32, 35, 37 are also common members. In other words, the right shutoff-opening device 2 is available only by adding one three-port on-off valve to the left shutoff-opening device 1 and adding to the valve mount 28 thereof the same members as the first communication channel coupling 31 and the first subchannel coupling 32. When the on-off valve to be added is a two-port valve, the fourth on-off valve 9 of the right shutoff-opening device 2 is replaced by a two-port valve, with the third subchannel coupling 37 removed from the mount 29. Thus, the left and right shutoff-opening devices 1 and 2 are amenable to various modifications.

Next, a detailed description will be given of the purge gas supply coupling 80, first inflow channel coupling 30 and first subchannel coupling 32.

Figure 3:
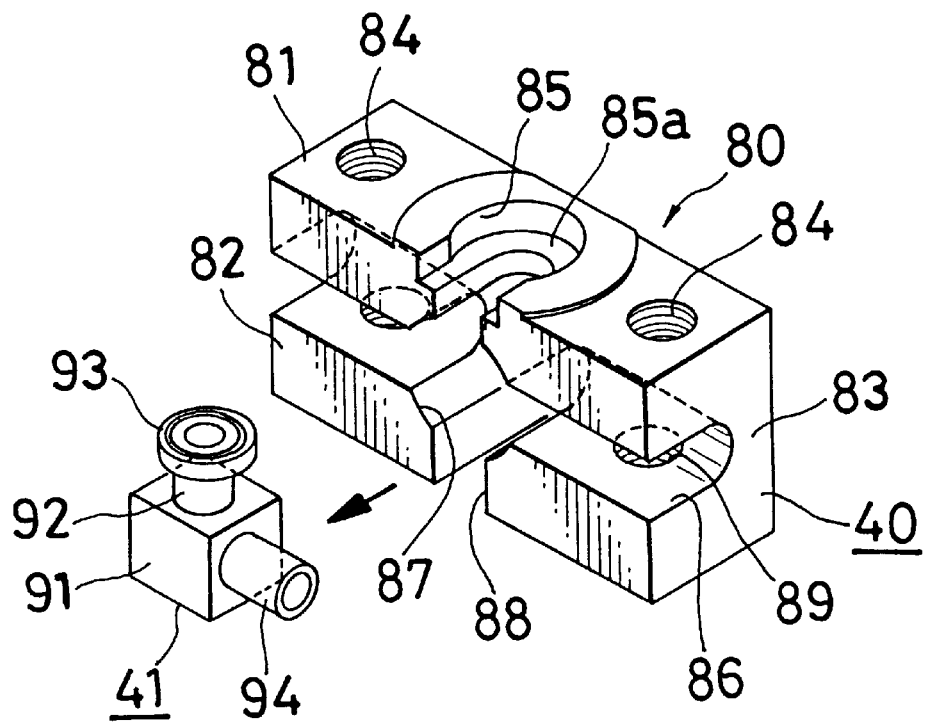
FIG. 3 is a perspective view showing a fluid controller coupling as a first embodiment of the invention.
Figure 4:
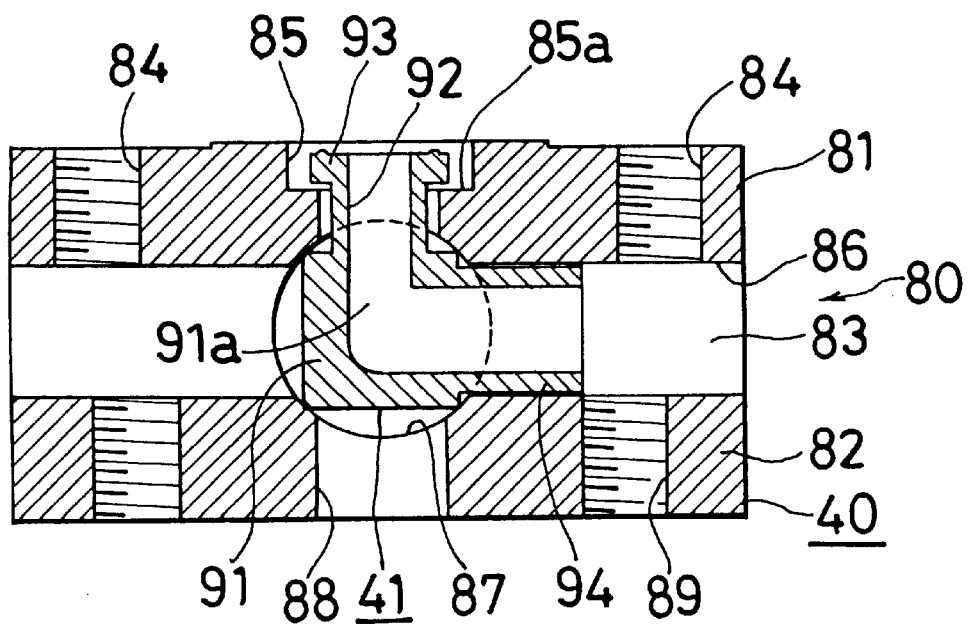
FIG. 4 is a view in longitudinal section of the same.
Figure 5:
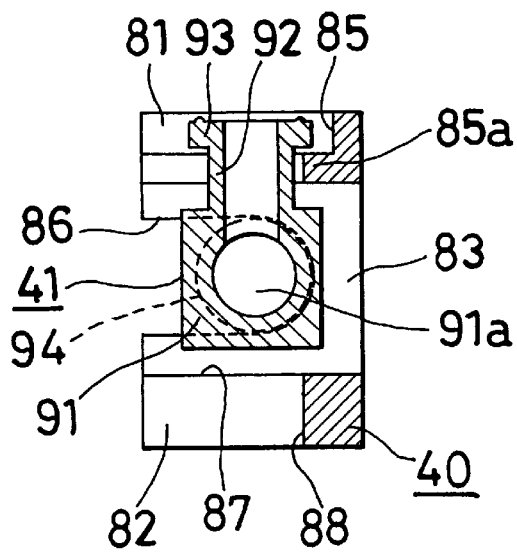
FIG. 5 is a view in cross section of the same.

With reference to FIGS. 3 to 5, the holding member 40 constituting the purge gas supply coupling 80 is U-shaped in cross section and comprises an upper wall 81, a lower wall 82 and a connecting wall 83. The L-shaped channel member 41 comprises a cubic body 91 fitting in a space between the upper and lower walls 81, 82 of the holding member 40 and formed with a channel 91a having one end opened upward and the other end opened longitudinally of the holding member 40, a tubular upward projection 92 communicating with the channel 91a in the body 91 and having an upper end extending through the upper wall 81 of the holding member 40 to communicate with the downward inflow channel 77a of the check valve 5, and a tubular lateral projection 94 communicating with the channel 91a and extending longitudinally of the holding member 40.

The upper wall 81 of the holding member 40 is formed at each of its opposite ends with a screw bore 84 for use in attaching the member 40 to a fluid controller (i.e., the first check valve 5 in the present case). Bolts 113 are screwed into the respective bores 84 from above the left valve main body 22, whereby the coupling 80 is joined to the first check valve 5. Formed in the center of upper wall 81 of the holding member 40 is a through bore 85 which is positioned immediately below the downward opening of the inflow channel 77a of the first check valve 5. The bore 85 extends widthwise of the upper wall 81 to the free side edge thereof. The lower surface of the upper wall 81, the upper surface of the lower wall 82 and the inner surface of the connecting wall 83 define a lateral projection fitting groove 86 having a U-shaped cross section and extending longitudinally of the holding member 40. The holding member 40 is formed at the midportion of its length with a body fitting bore 87 circular in section and orthogonal to the groove 86. The bore 87 has a diameter larger than the opening width of the lateral projection fitting groove 86. The body fitting bore 87 extends through the central portion of the connecting wall 83 and is formed by partially cutting out the upper wall inner surface of the holding member 40 and the lower wall upper surface thereof. The square section of the body 91 of the channel member 41 has a diagonal the length of which is slightly smaller than the diameter of the bore 87.

The lower wall 82 of the holding member 40 is centrally formed with a downward projection fitting groove 88 U-shaped in cross section for inserting therethrough a tubular downward projection of the channel member 41 when the member 41 has the downward projection. The lower wall 82 is also formed at each of its opposite ends with a screw bore 89 for use in attaching the holding member 40 to a base plate.

The upward projection 92 of the L-shaped channel member 41 has at its upper end a flange 93 for providing the seal 76. The lower edge of the bored portion 85 provides an inward flange 85a for supporting the flange 93.

The body 91 of the channel member 41 is fitted in the bore 87 between the upper and lower walls 81, 82 of the holding member 40, with the flange 93 of the channel member 41 bearing on the inward flange 85a of the holding member 40, whereby the holding member 40 is caused to hold the channel member 41 with ease without necessitating a cumbersome procedure such as welding. The channel member 41 is holdable by the holding member 40 merely by fitting the channel member body 91 into the bore 87 between the upper and lower walls 81, 82 or by causing the inward flange 85a of the holding member 40 to support the channel member flange 93.

Figure 6:
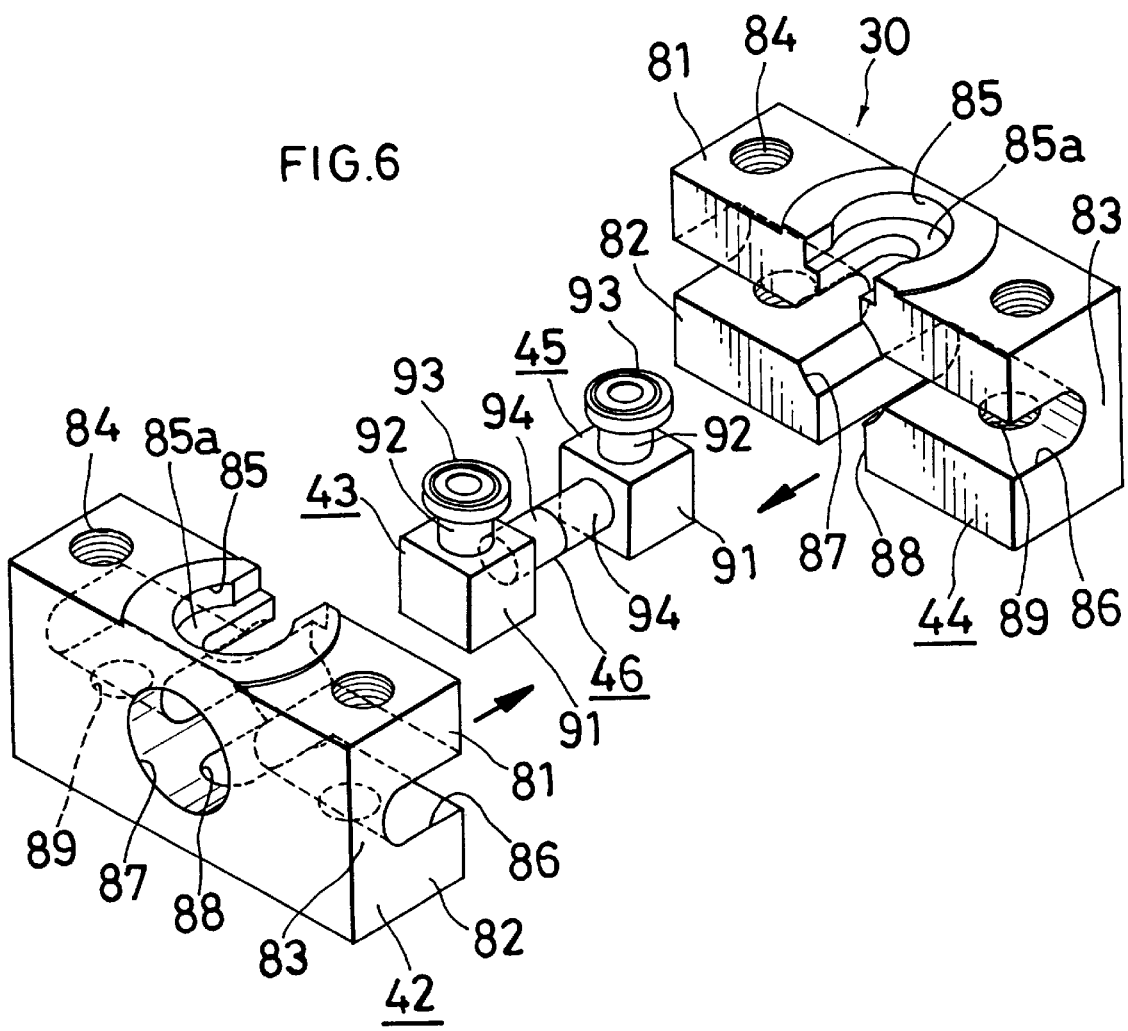
FIG. 6 is a perspective view of another fluid controller coupling as a second embodiment of the invention.
Figure 7:
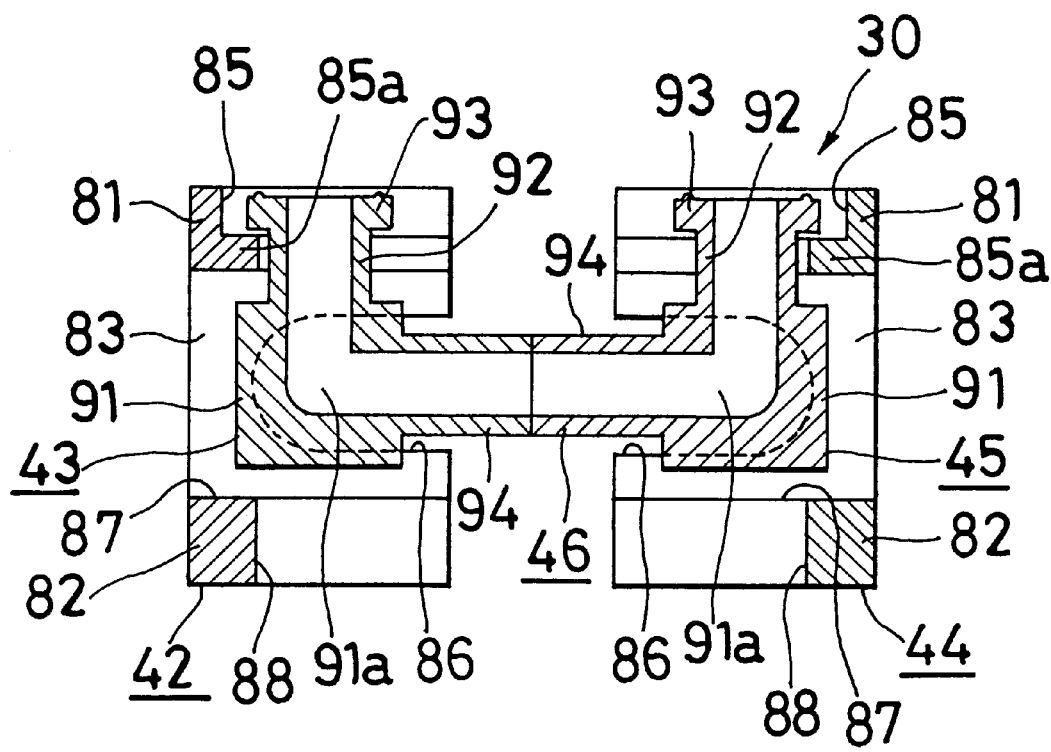
FIG. 7 is a view in longitudinal section of the same.

As shown in FIGS. 6 and 7, the holding members 42, 44 constituting the first inflow channel coupling 30 have the same construction as the holding member 40 of the purge gas supply coupling 80, and the L-shaped channel members 43, 45 of the coupling 30 have the same construction as the L-shaped channel member 41 of the coupling 80. Accordingly, like parts are designated by like reference numerals and will not be described repeatedly. The two holding members 42, 44 of the coupling 30 are spaced apart by a predetermined distance, with their openings opposed to each other. The tubular lateral projections 94 of the channel members 43, 45 are each so arranged as to be opposed to one of the opposed holding members 42, 44 and have their outer ends joined to each other. Bolts 113 are screwed in the screw bores 84 of one of the holding members, 42, from above the right main body 24 of the check valve 5, and bolts 113 are screwed in the screw bores 84 of the other holding member 44 from above the flange 12a of main body 12 of the first on-off valve 6, whereby the coupling 30 is joined to the check valve 5 and the first on-off valve 6.

Figure 8:
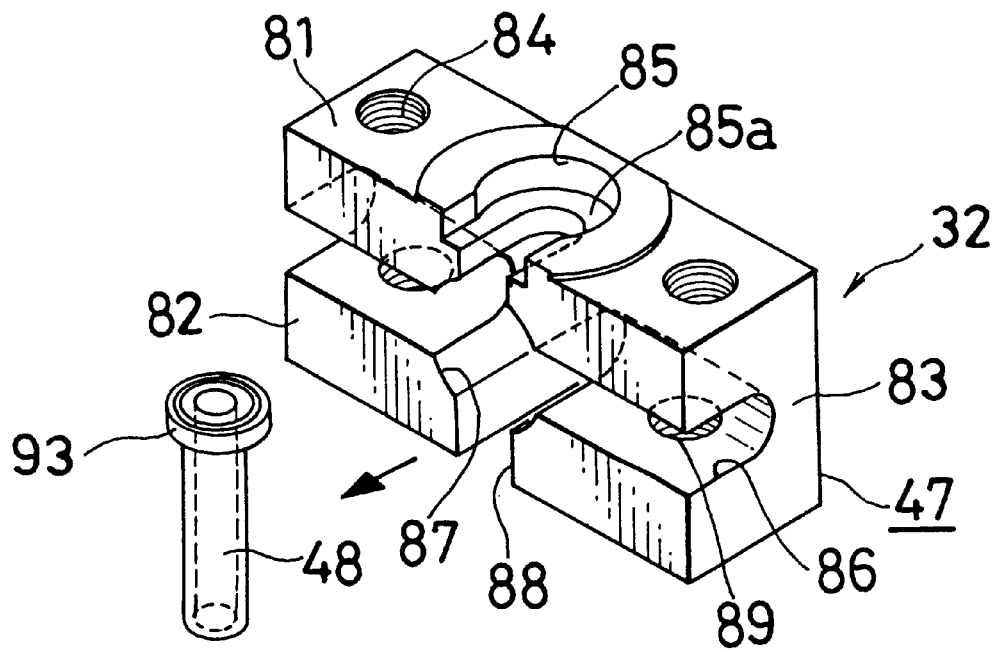
FIG. 8 is a perspective view of another fluid controller coupling as a third embodiment of the invention.

With reference to FIG. 8, the holding member 47 of the first subchannel coupling 32 has the same configuration as the holding members 40, 42, 44 described, while the channel member 48 is I-shaped. In connection with the coupling 32, like parts are designated by like reference numerals.

For use in the fluid control apparatus 4, the coupling 80 of the first embodiment shown in FIGS. 3 to 5 and the coupling 30 of the second embodiment shown in FIGS. 6 and 7 comprise the combination of holding member 40, 42, 44 and L-shaped channel member 41, 43, 45, and the coupling 32 of the third embodiment shown in FIG. 8 comprises the combination of holding member 47 and I-shaped channel member 48. Holding members of the same construction as above are used in combination with different channel members to provide various channel couplings other than these couplings 80, 30, 32. Examples of such couplings will be described below.

Figure 9:
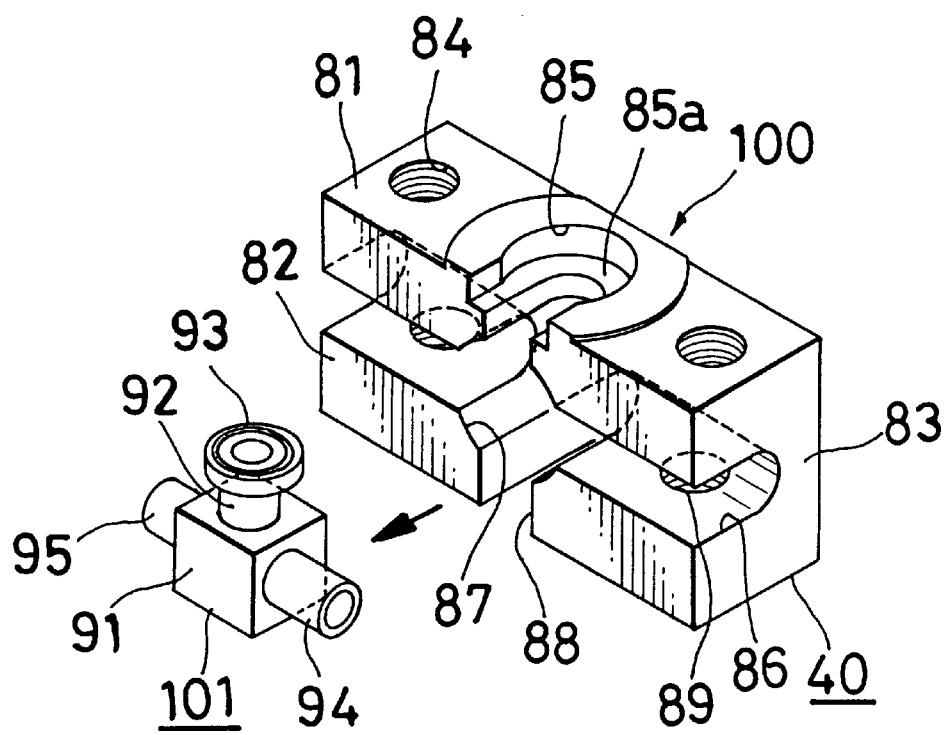
FIG. 9 is a perspective view of another fluid controller coupling as a fourth embodiment of the invention.
Figure 10:
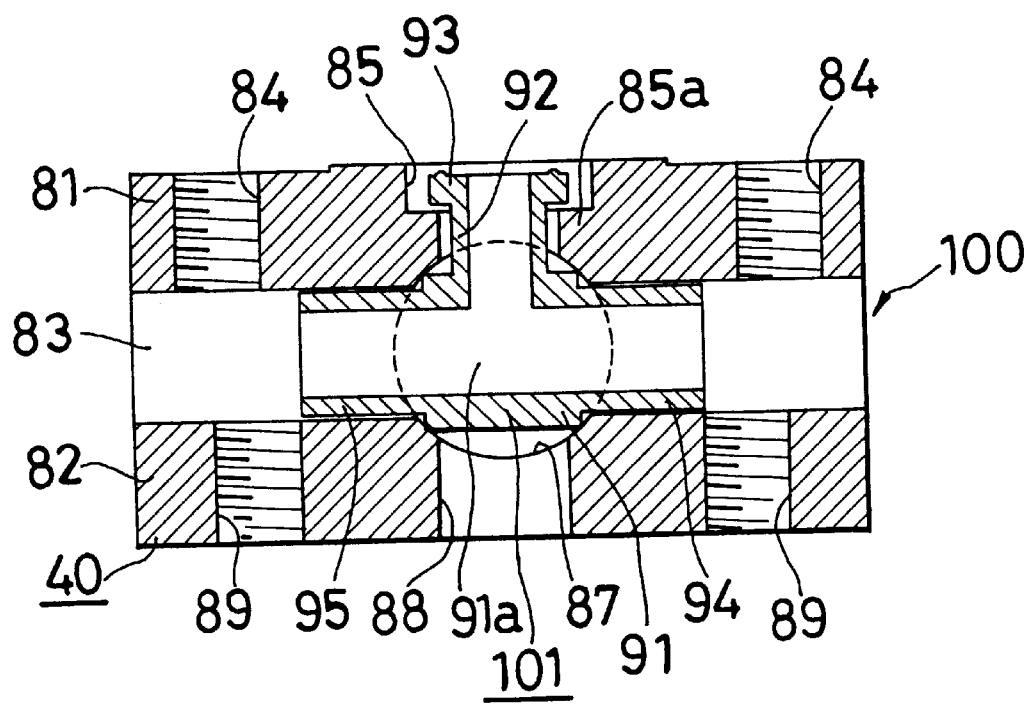
FIG. 10 is a view in cross section of the same.

FIGS. 9 and 10 show a coupling 100 of fourth embodiment which comprises the same holding member 40 as used in the coupling 80 of the first embodiment, and a channel member 101 including the same L-shaped channel member 41 as used in the coupling 80 and a tubular lateral projection 95 added to the member 41. The second tubular lateral projection 95 incorporated into the channel member 101 extends longitudinally of and in a reverse direction to the first tubular lateral projection 94. The channel member 101 has a channel which is inverted T-shaped in its entirety.

FIGS. 11 and 12 show a coupling 102 of fifth embodiment which comprises the same holding member 40 as used in the coupling 80 of the first embodiment, and a channel member 103 including the same L-shaped channel member 41 as used in the coupling 80 and a tubular lateral projection 96 added to the member 41. The second tubular lateral projection 96 incorporated into the channel member 103 extends widthwise of the holding member 40 and is orthogonal to the first tubular lateral projection 94 and to the tubular upward projection 92.

FIG. 13 shows a coupling 104 of sixth embodiment which comprises a coupling 80 of the first embodiment and couplings 100 of the fourth embodiment in combination therewith. The coupling 104 comprises three holding members 40 each having a U-shaped cross section and arranged in alignment, with the openings thereof facing toward the same direction, an L-shaped channel member 41 supported by the first of the holding members 40, and two inverted T-shaped channel members 101 supported respectively by the second and third holding members 40. Opposed lateral projections 94, 95 of each pair of adjacent channel members 41, 101 (101, 101) have outer ends connected together by a communication pipe 105 of required length. One of the two lateral projections 94, 95 of the inverted T-shaped channel member 101 held by the third holding member 40 is free and can be held in communication with the channel or piping of other fluid controller. Although not shown, the L-shaped member 41 of the coupling 104 of the sixth embodiment can be replaced by an inverted T-shaped channel member 101 or the channel member 103 of the coupling 102 of the fifth embodiment to provide various couplings.

The couplings 80, 30, 32, 100, 102, 104 according to the first to sixth embodiments are reduced in weight as compared with the blocklike couplings 31, 33, 34, 36, 39 since the holding members 40, 42, 44, 47 are U-shaped in cross section. The items to be altered for providing couplings which are altered in design, e.g., in the number of on-off valves or the positions of valve inlets or outlets, are limited only to the number of holding members, number of channel members, orientation of the openings of the holding members, and number, orientation and length of tubular lateral projections of the channel members, with the result that fluid control apparatus of altered specifications are readily available with the increase in the number of kinds of components diminished, hence standardization of component members. Further in producing the second, fifth and sixth couplings 30, 102, 104 which comprise a plurality of holding members 40, 42, 44 and a plurality of channel members 41, 43, 45, 101, the work required is mainly the joining of lateral projections 94, 95 of the channel members 41, 43, 45, 101, and the cumbersome boring operation that is no longer necessary renders the couplings easier to make.

With the embodiment shown in FIG. 1, the left shutoff-opening device 1 has two on-off valves 6, 7, while the right shutoff-opening device 2 has three on-off valves 8, 9, 10, whereas the number of on-off valves is variable suitably. Two shutoff-opening devices each having a suitable number of on-off valves are arranged respectively at the left and right sides of a massflow controller, and such arrangements are further arranged in parallel to provide a fluid control apparatus for use in semiconductor manufacturing equipment.

Figure 14:
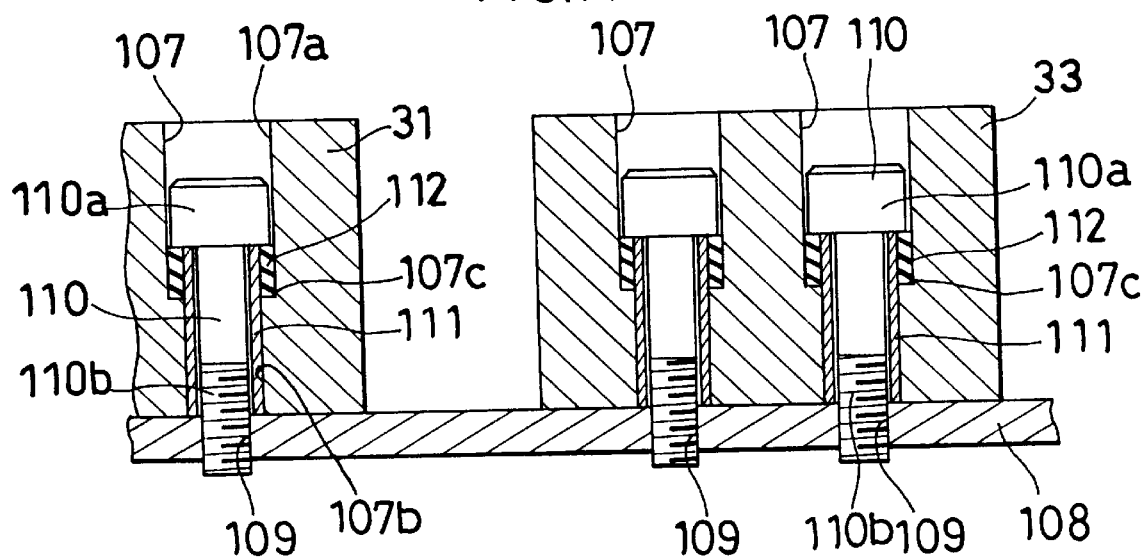
FIG. 14 is a sectional view of a device for attaching couplings.
Figure 15:
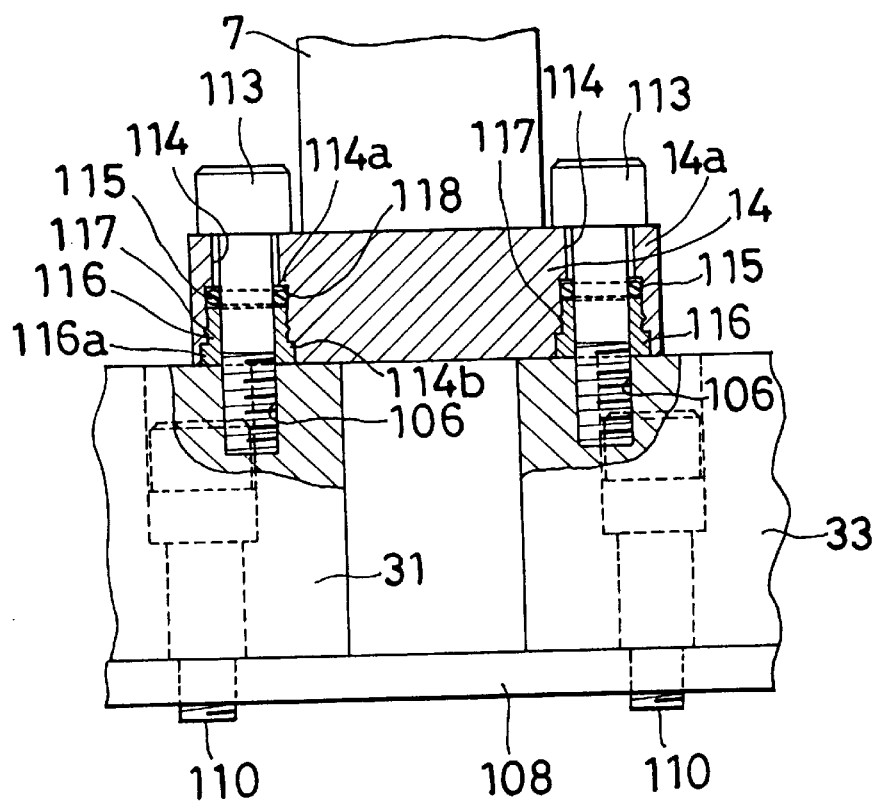
FIG. 15 is a sectional view showing a device for preventing a bolt from slipping off.

As partly shown in FIGS. 14 and 15, the fluid control apparatus 4 is installed by mounting the couplings 80, 30, 31, 32, 33, 34, 35, 36, 37, 38, 39 on a base plate 108 with coupling fixing bolts 110, attaching the fluid controllers, such as check valves 5, 11, on-off valves 6, 7, 8, 9, 10 and massflow controller 3, to the couplings 80, 30 to 39 as specified with body fixing bolts 113 and fixing the base plate 108 in position.

It is likely that the following problems will be encountered in installing the fluid control apparatus and in the maintenance and inspection of the massflow controller and on-off valves.

(1) When the on-off valve 6 is to be mounted on two or three couplings 31 with body fixing bolts 113, the upper surfaces of all the couplings 31 will not always be flush with one another, presenting difficulty in attaching the valve 6 to the couplings, with the possibility of faulty sealing.

(2) In the case where the base plate 108 is installed in a vertical position, the body fixing bolt 113 to be screwed in or removed will fall off to become lost.

With reference to FIGS. 14 and 15, a device will be described below for fixing the fluid control apparatus free of the above problems.

Referring to FIG. 14, two block couplings 31 for attaching the on-off valves 6, 7 thereto are mounted on the base plate 108. A screw bore 106 for use in attaching the block coupling 31 to the on-off valve main body is formed in the upper side of the coupling 31 at each of four corners thereof. A bolt bore 107 for inserting the coupling fixing bolt 110 therethrough for mounting the block coupling 31 on the base plate 108 is formed at each of two portions of the coupling 31 close to its central portion. The base plate 108 is formed with screw bores 109 for use in mounting the block coupling 31 on the base plate 108.

The bolt bore 107 of the block coupling 31 is formed by a large-diameter portion 107a having a diameter larger than the diameter of the head 110a of the coupling fixing bolt 110, and a small-diameter portion 107b continuous with the portion 107a, with a stepped portion 107c provided therebetween, and having a diameter intermediate between the diameter of the bolt head 110a and the diameter of the shank 10b of the bolt.

A sleevelike spacer 111 having a lower end bearing on the base plate 108 and an upper end positioned in the large-diameter portion 107a is fitted in the small diameter portion 107a of the bolt bore 107. The spacer 111 has an inside diameter larger than the diameter of the bolt shank 110b and an outside diameter smaller than the diameter of the bolt head 110a. The shank 110b of the coupling fixing bolt 110 is fitted in the spacer 111, with the bolt head 110a bearing on the upper end face of the spacer 111. The spacer 11 serves to determine the amount of tightening of the coupling fixing bolt 110, such that as the bolt 110 inserted through the bore 107 is screwed into the screw bore 109 of the base plate 108, the head 110a of the bolt 110 is supported by the spacer 111 bearing on the base plate 108, preventing further tightening of the bolt.

An annular rubber washer 112 having an outside diameter approximately equal to the diameter of the head 110a of the coupling fixing bolt 110 is fitted around the upper end of the spacer 111. The rubber washer 112 is held between the head 110a of the bolt 110 and the stepped portion 107c of the bolt bore 107. The vertical length of the rubber washer 112 is so determined that a compressive force will act on the washer when the bolt 110 is completely tightened up in the state shown in FIG. 14. Thus, the couplings 31 are biased toward the base plate 108 by the rubber washers 112. The rubber washers 112, which are elastic, can be further deformed by compression, so that the couplings 31 are movable away from the base plate 108. Accordingly, even if the upper surfaces of the couplings 31 are not flush with each other, the couplings 31 are brought closer to the on-off valve 7 as the on-off valve 7 is fastened to the couplings 31 with the body fixing bolts 113, which can therefore be tightened easily. Consequently, all the seals 76 can be subjected to a proper pressure to ensure fluid tightness.

FIG. 15 shows a device for preventing the body fixing bolt 113 from slipping off for use in attaching the on-off valve 7 to two block couplings 31, 33.

With reference to the drawing, bolt shank bores 114 are formed in the flange 14a of the main body 14 of the on-off valve 7. Each of the shank bores 114 has stepped portions 114a and 114b respectively at an intermediate part of the bore and a part thereof close to the bore lower end to give the largest diameter to the lower end of the bore 114. An O-ring 115 is fitted in the shank bore 114 from its lower end in bearing contact with the intermediate stepped portion 114a. A bush 116 is further fitted in the bore 114 from the larger diameter side for preventing the O-ring 115 from slipping out. Thus, an annular recess 118 for accommodating the O-ring is defined by the intermediate stepped portion 114a, the upper end face of the bush 116 and the periphery of the bored portion 114 for the bolt shank. The bush 116 is formed at its lower end with a flange 116a in bearing contact with the stepped portion 114b close to the bore lower end. The bush 116 further has at an intermediate portion thereof an annular ridge 117 with an outside diameter slightly larger than the diameter of the shank bore portion having this intermediate portion fitted in. When the bush 116 is forced into the shank bore 114 from its larger diameter side, the flange 116a bears against the stepped portion 114b close to the bore lower end, and the annular ridge 117 is collapsed, whereby the bush 116 is prevented from slipping out, consequently preventing the O-ring 115 from slipping off. The O-ring 115 has an inside diameter slightly smaller than the outside diameter of the shank of the body fixing bolt 113. Since the O-ring is elastic, the shank of the bolt 113 can be forcibly inserted through the O-ring 115 with extreme ease. When the fixing bolt 113 is unfastened and becomes disengaged from the screw bore 106, the elastic force of the O-ring 115 retains the bolt 113 on the ring 115. Accordingly, even in the case where the base plate 108 is installed in a vertical position (as turned from the illustrated horizontal position thereof), this feature obviates the likelihood that the body fixing bolt 113 to be screwed in or removed will fall off to become lost.

What is claimed is:

1. A coupling for a fluid controller, the coupling being attachable to an opening portion of a downward channel of the fluid controller, the coupling comprising a holding member having an upper wall, a lower wall and a connecting wall and a tubular channel member held by the holding member, the channel member having an upper end inserted in a through bore formed in the upper wall of the holding member to communicate with the downward channel of the fluid controller, the upper wall of the holding member being formed with screw bores for use in attaching the holding member to the fluid controller.

2. A coupling for a fluid controller according to claim 1 wherein the upper end of the channel member has an outward flange, and the through bore of the upper wall of the holding member has an inward flange for supporting the outward flange.

3. A coupling for a fluid controller according to claim 1 wherein the channel member comprises a body having an inner channel and fitted in a space between the upper wall of the holding member and the lower wall thereof, a tubular upward projection communicating with the inner channel of the body and having the upper end inserted in the through bore in the upper wall of the holding member to communicate with the downward channel of the fluid controller, and at least one tubular lateral projection communicating with the inner channel of the body and extending laterally.

4. A coupling for use with two fluid controllers each having a downward channel to hold the channels in communication with each other, the coupling comprising first and second holding members each having an upper wall, a lower wall and a connecting wall and arranged at a spacing with openings thereof opposed to each other, and a U-shaped tubular channel member, the channel member having one end inserted in a through bore formed in the upper wall of the first holding member to communicate with the downward channel of the first of the fluid controllers, the channel member having the other end inserted in a through bore formed in the upper wall of the second holding member to communicate with the downward channel of the second fluid controller, the upper walls of the holding members being formed with screw bores for use in attaching the holding members to the respective fluid controllers.

5. A coupling according to claim 4 wherein the channel member comprises a first L-shaped channel member and a second L-shaped channel member, the first L-shaped channel member comprising a body having an inner channel and fitted in a space between the upper wall of the first holding member and a lower wall thereof, a tubular upward projection communicating with the inner channel of the body and having an upper end inserted in the through bore in the upper wall of the first holding member to communicate with the downward channel of the first fluid controller, and a tubular lateral projection communicating with the inner channel of the body and extending toward the second holding member, the second L-shaped channel member comprising a body portion having an inner channel and fitted in a space between the upper wall of the second holding member and a lower wall thereof, a tubular upward projection communicating with the inner channel of the body portion and having an upper end inserted in the through bore in the upper wall of the second holding member to communicate with the downward channel of the second fluid controller, and a tubular lateral projection communicating with the inner channel of the body portion and extending toward the first holding member, the tubular lateral projections of the two L-shaped channel members having outer ends joined to each other.

6. A coupling for use with a plurality of fluid controllers each having a downward channel to hold the channels in communication with one another, the coupling comprising a plurality of holding members each having a U-shaped cross section and arranged in alignment with openings thereof facing toward the same direction, and a plurality of channel members held by the respective holding members, each of the channel members comprises a body having an inner channel and fitted in a space between upper and lower walls of the holding member, a tubular upward projection communicating with the inner channel of the body and having an upper end inserted in a through bore in the upper wall of the holding member to communicate with the downward channel of the fluid controller, and tubular lateral projections communicating with the inner channel of the body and each extending toward the holding member adjacent thereto, the opposed lateral projections of each pair of adjacent channel members having outer ends joined to each other, the upper wall of each of the holding members having screw bores for use in attaching the holding member to the fluid controller.

* * * * *